United States Patent
Chen et al.

(10) Patent No.: US 9,762,306 B2
(45) Date of Patent: Sep. 12, 2017

(54) METHOD, APPARATUS AND SYSTEM FOR ELECTRICAL DOWNTILT ADJUSTMENT IN A MULTIPLE INPUT MULTIPLE OUTPUT SYSTEM

(71) Applicant: INTEL IP CORPORATION, Santa Clara, CA (US)

(72) Inventors: Xiaogang Chen, Beijing (CN); Yuan Zhu, Beijing (CN); Feng Xue, Redwood City, CA (US); Hooman Shirani-Mehr, Portland, OR (US); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 8 days.

(21) Appl. No.: 14/911,262

(22) PCT Filed: Jun. 27, 2014

(86) PCT No.: PCT/US2014/044629
§ 371 (c)(1),
(2) Date: Feb. 9, 2016

(87) PCT Pub. No.: WO2015/020736
PCT Pub. Date: Feb. 12, 2015

(65) Prior Publication Data
US 2016/0191135 A1    Jun. 30, 2016

Related U.S. Application Data

(60) Provisional application No. 61/863,902, filed on Aug. 8, 2013.

(51) Int. Cl.
*H04B 7/06* (2006.01)
*H04L 5/14* (2006.01)
(Continued)

(52) U.S. Cl.
CPC ....... *H04B 7/0626* (2013.01); *E04G 23/0218* (2013.01); *E04H 9/025* (2013.01);
(Continued)

(58) Field of Classification Search
CPC .................................................... H04B 7/0626
See application file for complete search history.

(56) References Cited

U.S. PATENT DOCUMENTS

2008/0062062 A1    3/2008  Borau et al.
2011/0103504 A1    5/2011  Ma
(Continued)

FOREIGN PATENT DOCUMENTS

EP          2161783 A1       3/2010
WO    WO-2010055749          5/2010
(Continued)

OTHER PUBLICATIONS

Extended European Search Report issued Mar. 7, 2017 from European Patent Application No. 14834770.1, 7 pages.
(Continued)

*Primary Examiner* — Andrew Lai
*Assistant Examiner* — Jamaal Henson
(74) *Attorney, Agent, or Firm* — Schwabe, Williamson & Wyatt, P.C.

(57) ABSTRACT

Machine-readable media, methods, apparatus and system for electrical downtilt adjustment in a multiple input multiple output system are disclosed. In some embodiments, an apparatus may comprise an electrical downtilt module to determine an electrical downtilt angle for an antenna port selected from a number of antenna ports based on information from an user equipment (UE); and a codebook module to select a codeword corresponding to the antenna port from a codebook and calculate a weight of an antenna array of the eNB through inputting the electronic downtilt angle into the
(Continued)

codeword, wherein the codebook has a first number of codewords, each of the codewords having a second number of elements to represent the weight of the antenna array, and wherein each of the codewords corresponds to each of the antenna ports and each of the elements corresponds to each antenna of the antenna array.

21 Claims, 8 Drawing Sheets (51) Int. Cl.
| | |
|---|---|
| H04W 56/00 | (2009.01) |
| H04W 4/00 | (2009.01) |
| H04W 52/02 | (2009.01) |
| H04W 76/04 | (2009.01) |
| H04W 36/08 | (2009.01) |
| H04W 72/08 | (2009.01) |
| H04W 76/02 | (2009.01) |
| H04W 36/28 | (2009.01) |
| H04L 5/00 | (2006.01) |
| H04W 24/10 | (2009.01) |
| H04L 1/18 | (2006.01) |
| E04G 23/02 | (2006.01) |
| E04H 9/02 | (2006.01) |
| H04W 16/26 | (2009.01) |
| H04W 24/02 | (2009.01) |
| H04W 48/16 | (2009.01) |
| H04W 8/02 | (2009.01) |
| H04W 36/32 | (2009.01) |
| H04W 64/00 | (2009.01) |
| H04W 72/04 | (2009.01) |
| H04W 4/02 | (2009.01) |
| H04W 36/14 | (2009.01) |
| H04L 27/26 | (2006.01) |
| H04W 88/08 | (2009.01) |
| H04W 48/12 | (2009.01) |
| H04W 74/08 | (2009.01) |
| H04W 88/04 | (2009.01) |

(52) U.S. Cl.
CPC ......... *H04B 7/0617* (2013.01); *H04B 7/0639* (2013.01); *H04L 1/1812* (2013.01); *H04L 5/0048* (2013.01); *H04L 5/0058* (2013.01); *H04L 5/14* (2013.01); *H04W 4/005* (2013.01); *H04W 8/02* (2013.01); *H04W 16/26* (2013.01); *H04W 24/02* (2013.01); *H04W 24/10* (2013.01); *H04W 36/08* (2013.01); *H04W 36/28* (2013.01); *H04W 36/32* (2013.01); *H04W 48/16* (2013.01); *H04W 52/0206* (2013.01); *H04W 52/0209* (2013.01); *H04W 52/0219* (2013.01); *H04W 56/0005* (2013.01); *H04W 64/006* (2013.01); *H04W 72/082* (2013.01); *H04W 76/02* (2013.01); *H04W 76/023* (2013.01); *H04W 76/046* (2013.01); *H04L 5/0053* (2013.01); *H04L 5/1469* (2013.01); *H04L 27/2602* (2013.01); *H04W 4/023* (2013.01); *H04W 36/14* (2013.01); *H04W 48/12* (2013.01); *H04W 72/0406* (2013.01); *H04W 72/0446* (2013.01); *H04W 74/0833* (2013.01); *H04W 88/04* (2013.01); *H04W 88/08* (2013.01); *Y02B 60/50* (2013.01)

(56) References Cited

U.S. PATENT DOCUMENTS

| | | | |
|---|---|---|---|
| 2012/0015684 A1* | 1/2012 | Noji | H04B 7/028 455/524 |
| 2013/0010880 A1 | 1/2013 | Koivisto et al. | |
| 2013/0244594 A1* | 9/2013 | Alrabadi | H04B 7/0413 455/78 |
| 2015/0116153 A1* | 4/2015 | Chen | H01Q 5/22 342/359 |
| 2016/0065290 A1* | 3/2016 | Zhu | H04W 52/0209 370/329 |

FOREIGN PATENT DOCUMENTS

| | | |
|---|---|---|
| WO | WO-2013017104 | 2/2013 |
| WO | WO-2013034109 | 3/2013 |
| WO | WO-2015020736 | 2/2015 |

OTHER PUBLICATIONS

International Search Report and Written Opinion for PCT Patent Application No. PCT/US2014/044629 mailed Nov. 5, 2014, 9 pages.
International Preliminary Report on Patentability for PCT Patent Application No. PCT/US2014/044629 mailed Feb. 18, 2016, 13 pages.

* cited by examiner

METHOD, APPARATUS AND SYSTEM FOR ELECTRICAL DOWNTILT ADJUSTMENT IN A MULTIPLE INPUT MULTIPLE OUTPUT SYSTEM

CROSS REFERENCE TO RELATED APPLICATIONS

This application is a U.S. National Phase application under 35 U.S.C. §371 of International Application No. PCT/US14/44629, filed Jun. 27, 2014, entitled "METHOD, APPARATUS AND SYSTEM FOR ELECTRICAL DOWNTILT ADJUSTMENT IN A MULTIPLE INPUT MULTIPLE OUTPUT SYSTEM," which claims priority to U.S. Provisional Patent Application No. 61/863,902, filed Aug. 8, 2013, entitled "ADVANCED WIRELESS COMMUNICATION SYSTEMS AND TECHNIQUES," the entire contents of which are incorporated herein by reference.

FIELD

Embodiments of the present invention relate generally to the field of communications, and more particularly, to how to adjust an electrical downtilt angle in a multiple input multiple output (MIMO) system.

BACKGROUND INFORMATION

Multiple-input and multiple-output (MIMO) technology is the use of multiple antennas at both one or more transmitters and one or more receivers. A MIMO system can be used to increase data throughput and link reliability of a network. A three-dimentional (3D) or full-dimentional (FD) MIMO system can be used in MIMO network to enhance the cellular performance by deploying antenna elements in horizontal and vertical dimensions, e.g., a two dimensional (2D) antenna array.

In the legacy MIMO system, an evolved node B (eNB) may have to use the same electrical downtilt for all data transmissions, which may also introduce interference to a neighbor cell.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for electrical downtilt adjustment in a three-dimension (3D) or full dimension (FD) multiple-input multiple-output (MIMO) system.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
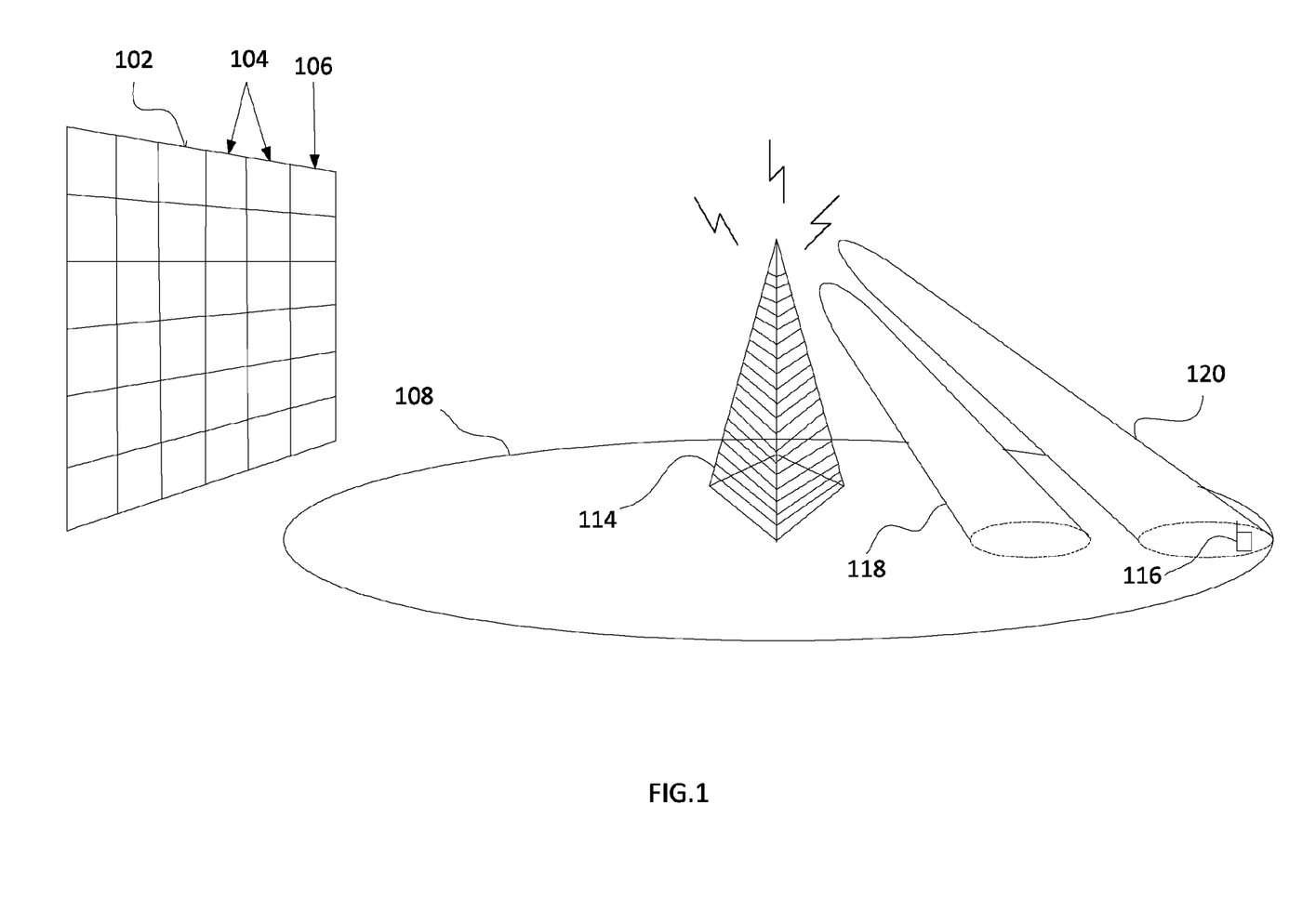
FIG. 1 schematically illustrates a communication network deploying a two-dimensional (2D) antenna array in a three-dimensional (3D) or full-dimensional (FD) multiple-input multiple-output (MIMO) system, in accordance with various embodiments.

FIG. 1 schematically illustrates a communication network 100 deploying a two-dimensional (2D) antenna array 102 in a three-dimensional (3D) or full-dimensional (FD) multiple-input multiple-output (MIMO) system, in accordance with various embodiments.

In various embodiments, the 2D antenna array 102 may comprise a plurality of antenna elements 104 in one or more antenna column 106 in vertical direction. The 2D antenna array 102 may be mounted on a transmission point, e.g., an evolved node B (eNB) 114, with a coverage area 108 where a user equipment (UE) 116 may be covered. In other embodiments, the 2D antenna array 102 may comprise one antenna column 106 in vertical direction.

The vertical directivity provided by the antenna array 102 may be depicted by two different beam direction geometries, a first beam direction geometry 118 and a second beam direction geometry 120. A beam direction geometry may depict a region with respect to the transmission point (e.g., the eNB 114) where a corresponding signal is higher, but the corresponding signal can be present in other regions as well.

In the 3D MIMO system, a signal radiation pattern (or a beamforming) of the antenna array 102 at the eNB 114 may be tilted along a vertical axis. The degree of the vertical tilting or the tilting angle can be measured relative to a horizontal plain of reference. The tilting angle can be referred to as an electrical downtilt angle of the antenna array. The name of electrical downtilt angle may be given in comparison to a mechanical downtilt angle which may refer to an angle between the antenna array and the vertical axis, if the antenna array is physically tilted with respect to the vertical direction.

Figure 2:
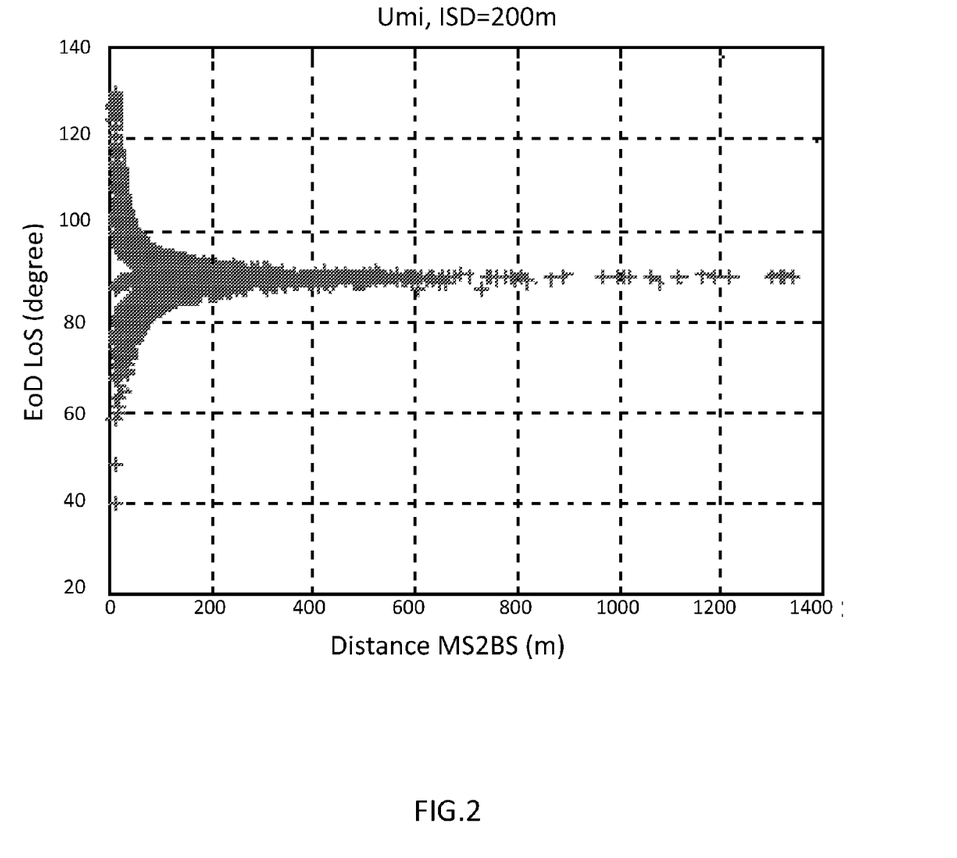
FIG. 2 schematically illustrates an elevation angle of departure (EoD) with a user equipment (UE)-to-evolved Node B (eNB) distance in the communication network, in accordance with various embodiments.

FIG. 2 schematically illustrates an elevation angle of departure (EoD) with a user equipment (UE)-to-evolved Node B (eNB) distance in the communication network 100, in accordance with various embodiments. The EoD may refer to the angle between the line of sight (LoS) direction and the reference direction. As shown in FIG. 2, when the distance between the UE 116 and eNB 114 increases, for instance, when the UE 116 reaches the cell edge of the eNB 114, the EoD may converge to 90 degree.

Figure 3A:
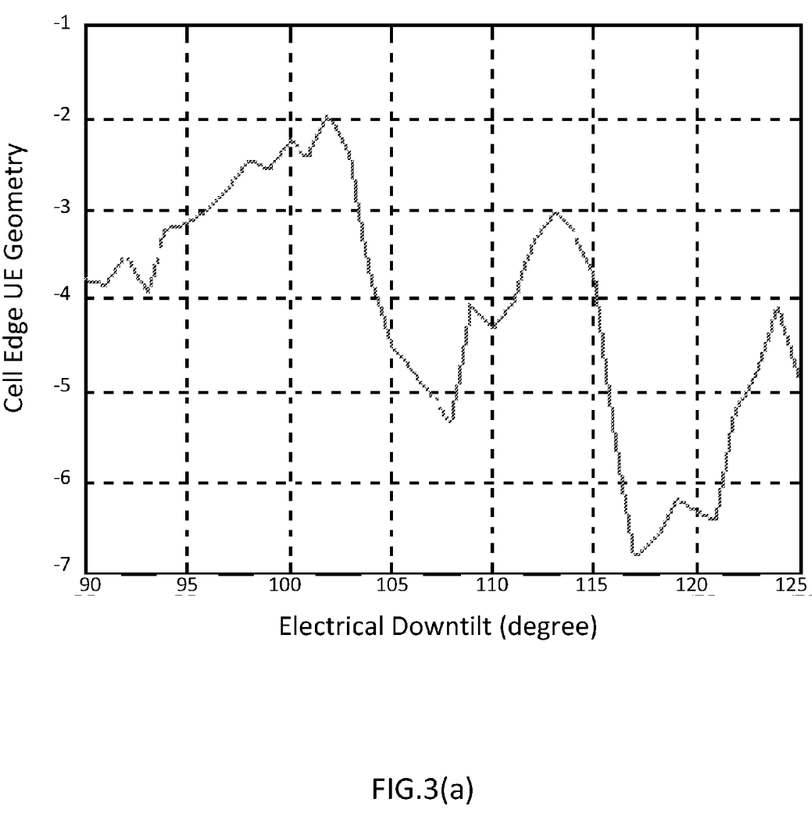
FIG. 3a schematically illustrates a cell edge geometry with an electrical downtilt angle in the communication network, in accordance with various embodiments.

FIG. 3a schematically illustrates a cell edge geometry with an electrical downtilt angle in the communication network 100, in accordance with various embodiments. For instance, the cell edge geometry may be represented by a signal-noise-ratio (SNR) at the cell edge for the eNB 114. As shown in FIG. 3a, several SNR peaks may occur at electrical downtilt angles such as 102 degree, 114 degree, 126 degree, 78 degree, 138 degree, 66 degree, 105 degree, 54 degree and so on.

Figure 3B:
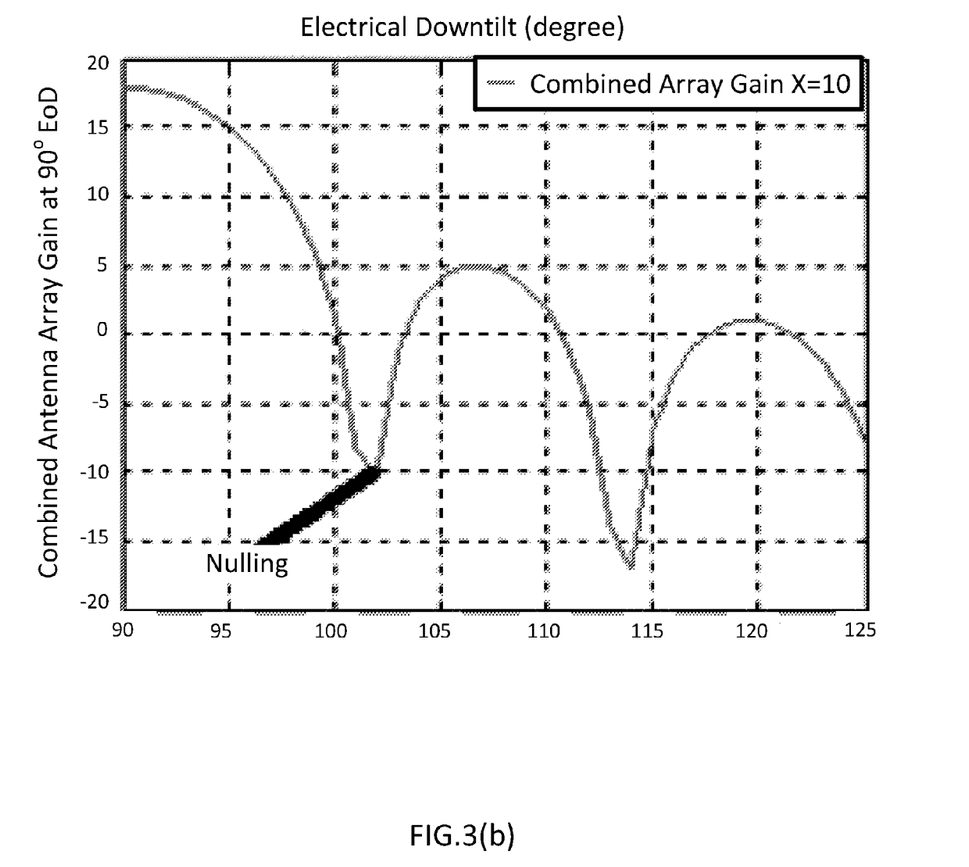
FIG. 3b schematically illustrates an antenna array gain at 90 degree EoD with the electrical downtilt angle in the communication network, in accordance with various embodiments.

FIG. 3b schematically illustrates a combined antenna array gain at 90 degree EoD with the electrical downtilt angle in the communication network 100, in accordance with various embodiments. For instance, the combined antenna array gain at 90 degree EoD, namely, the combined antenna array gain when the UE 116 reaches the cell edge of the eNB 114, may generate nulling directions at the electrical downtilt angles such as 102 degree, 114 degree, 126 degree, 78 degree, 138 degree, 66 degree, 105 degree, 54 degree and/or so on.

In some embodiments, an electrical downtilt angle may be adjusted to maximize the signal strength (e.g., SNR) and minimize the interference leakage to neighboring cells.

Figure 4:
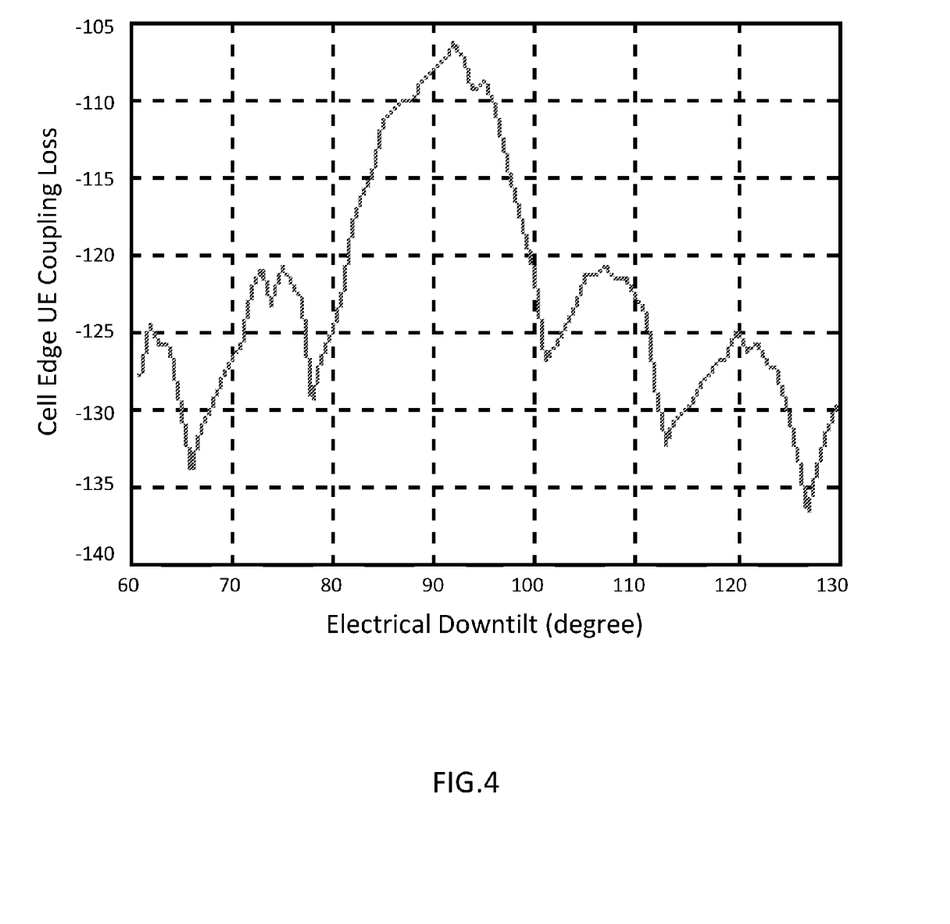
FIG. 4 schematically illustrates a cell edge coupling loss and the electrical downtilt angle in the communication network, in accordance with various embodiments.

FIG. 4 schematically illustrates a cell edge coupling loss with the electrical downtilt angle in the communication network 100, in accordance with various embodiments. For instance, several cell edge coupling loss peaks may occur at the electrical downtilt angles such as 109 degree, 122 degree, 118 degree, 86 degree and/or so on.

Figure 5:
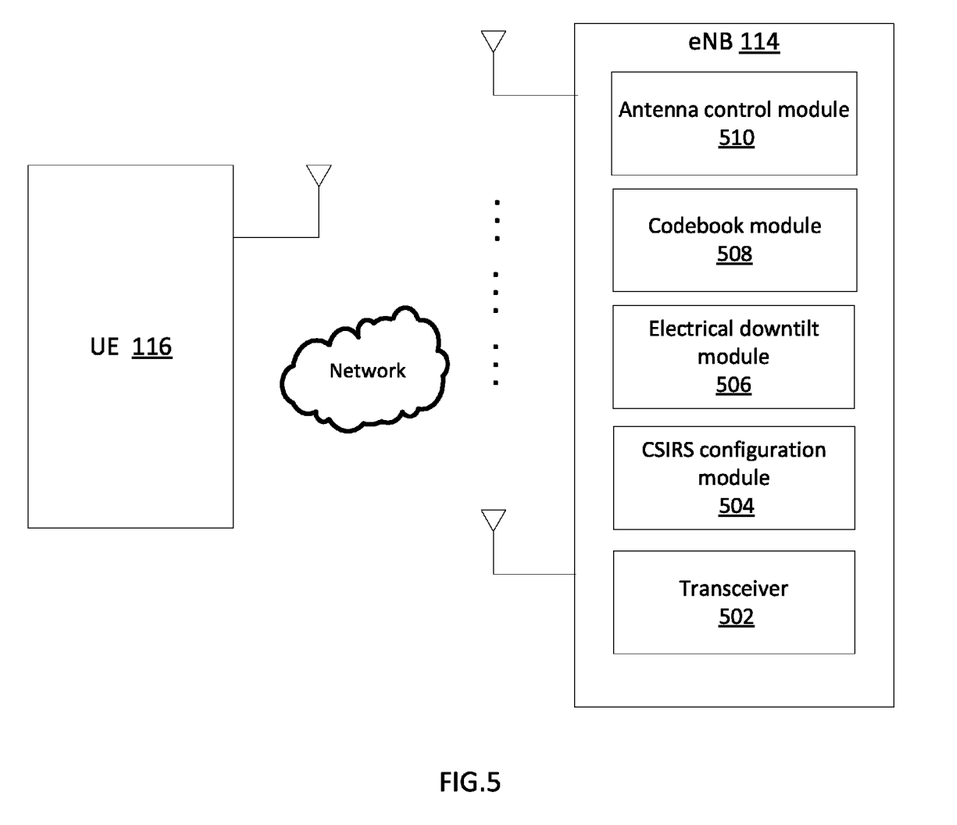
FIG. 5 schematically illustrates a system of adjusting the electrical downtilt angle in the communication network, in accordance with various embodiments.

FIG. 5 schematically illustrates a system of adjusting an electrical downtilt angle in the communication network 100, in accordance with various embodiments. In some embodiments, the eNB 114 may comprise a transceiver 502, a channel state information reference signal (CSIRS) configuration module 504, an electrical downtilt module 506, a codebook module 508, an antenna control module 510, and others.

In various embodiments, the CSIRS configuration module 504 may generate CSIRS configuration information for CSI reporting to the UE 116. In some embodiments, the CSIRS configuration information may include the number of CSIRS antenna ports, a CSIRS pattern index corresponding to a certain CSIRS pattern, a duty circle or periodicity of CSIRS transmission, and/or others. The transceiver 502 may transmit the CSIRS configuration information to the UE 116 and receive information related to a preferred antenna port from the UE 116. The information may include a preferred antenna port that UE 116 selects based on the CSIRS configuration information, and/or precoding matrix indicator (PMI) estimated based on the CSIRS configuration which may help the eNB 114 to determine an antenna port to be allocated to the UE 116.

In various embodiments, the electrical downtilt module 506 may determine an electrical downtilt angle for the antenna port determined based on the information received from the UE 116, e.g., the preferred antenna port, the PMI and/or others. In various embodiments, the electrical downtilt module 506 may determine an angle which may correspond to a cell edge UE geometry peak as illustrated in FIG. 3a or correspond to a combined antenna array gain nulling direction at 90 degree EoD as illustrated in FIG. 3b. As stated in the above, examples of the electrical downtilt angles may include at least one from a group having 102 degree, 114 degree, 126 degree, 78 degree, 138 degree, 66 degree, 105 degree, 54 degree and/or so on.

By determining the electrical downtilt angle corresponding to the cell edge geometry peak, the combined antenna array gain nulling direction, the interference to neighboring cells when the UE 116 reaches to the cell edge for the eNB 114 may be minimized.

In various embodiments, the codebook module 508 may generate a codebook for the antenna elements of the antenna array 102, assuming that the antenna array 102 has the antenna elements 104 in the one or more antenna columns 106 in the vertical direction. The codebook may comprise a number of codewords. The codeword may comprise a number of vector elements, each vector element corresponding to one of the antenna elements 104. In various embodiments, the codeword may be expressed in the following equation:

$$w_i = \frac{1}{\sqrt{M}} \begin{bmatrix} 1 \\ e^{j(\alpha+\theta_i)} \\ e^{j2(\alpha+\theta_i)} \\ \vdots \\ e^{j(M-1)(\alpha+\theta_i)} \end{bmatrix}, 0 \leq i \leq N-1$$

wherein, M represents the number of the antenna elements 104, N represents the number of antenna ports (not shown in FIG. 5), $w_i$ represents the weight of the antenna array 102 at $i^{th}$ antenna port, and $\alpha+\theta_i$ represents the electronic downtilt angle in which α represents the angle of mechanical downtilt and $\theta_i$ represents the angle offset relative to the mechanical downtilt. However, in other embodiments, the codebook may be pre-stored in a storage of the eNB 116 (not shown in FIG. 5) by a developer and therefore the codebook module 508 may not need to generate the codebook.

In various embodiments, the codebook module 508 may select a codeword corresponding to the antenna port (e.g., the $i^{th}$ antenna port) that UE 116 selects and further calculate the antenna array weight $w_i$ by inputting the electrical downtilt angle determined by the electrical downtilt module 506 into the above-stated codeword. In an embodiment, it may be desired to have the electrical downtilt angle corresponding to one of the cell edge geometry peaks as shown in FIG. 3a or to one of the combined antenna array gain at 90 degree EoD as shown in FIG. 3b. In view of this, if $$\alpha = \frac{102}{180} * \pi$$

and M=10, N=8, then $$\theta_i \in \frac{\{0, 12, 24, -24, 36, -36, 48, -48\}}{180} * \pi.$$

In another embodiment, it may be desired to have the electrical downtilt angle corresponding to one of the cell edge coupling loss peaks as shown in FIG. 4. In view of this, if $$\alpha = \frac{102}{180} * \pi$$

and M=10, N=8, then $$\theta_i \in \frac{\{0, 12, 24, -24, 7, 20, 16, -16\}}{180} * \pi.$$

In various embodiments, N electrical downtilt angles (e.g., $\alpha+\theta_i$) may be determined for the N antenna ports which may correspond to any of the cell edge geometry peaks, any of the combined antenna array gain nulling directions at 90 degree EoD, and/or any of the cell edge coupling loss peaks, etc. It may reduce the interference to neighboring cells, or increase the geometry of the cell edge UE 116 when the UE 116 reaches to the cell edge for the eNB 114.

In various embodiments, the antenna control module 510 may control the antenna array 102 by mapping the antenna elements 104 of the antenna array 102 to the $i^{th}$ antenna port with the antenna array weight calculated by the codebook module 508. In this way, the antenna array 102 may receive or transmit data to or from the UE 116 at the $i^{th}$ antenna port.

Figure 6:
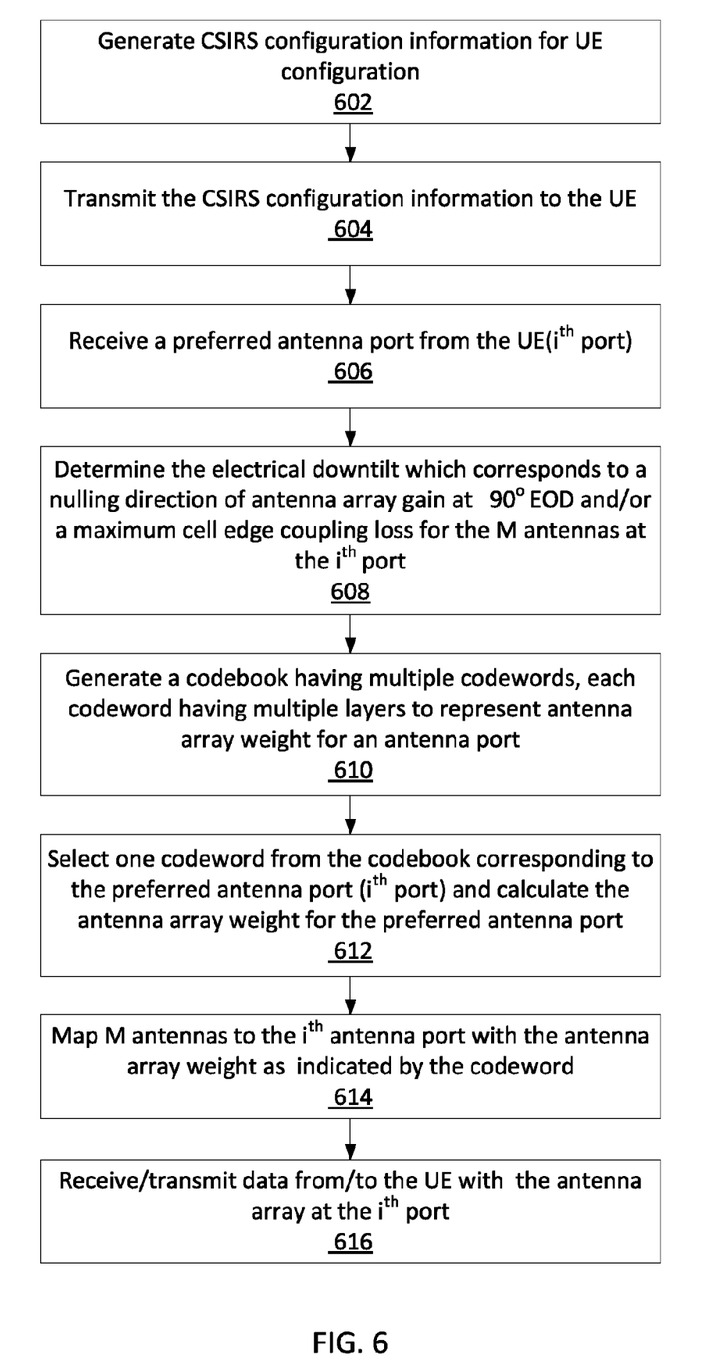
FIG. 6 schematically illustrates a method of adjusting the electrical downtilt angle by an eNB in the communication network, in accordance with various embodiments.

FIG. 6 schematically illustrates a method of adjusting the electrical downtilt angle by an eNB in the communication network, in accordance with various embodiments. In an embodiment, the CSIRS configuration module 504 or other device of the eNB 114 may generate CSIRS configuration information for CSI reporting to the UE 116, in block 602. The CSIRS configuration information may include the number of CSIRS antenna ports, a CSIRS pattern index corresponding to a certain CSIRS pattern, a duty circle or periodicity of CSIRS transmission, and/or others. The transceiver 502 of eNB 116 may transmit the CSIRS configuration information to the UE 116 in block 604, and may receive information associated to a preferred antenna port from the UE 116 in block 606. The information may include a preferred antenna port that UE 116 selects based on the CSIRS configuration information, and/or precoding matrix indicator (PMI) estimated based on the CSIRS configuration which may help the eNB 114 to determine an antenna port to be allocated to the UE 116.

In an embodiment, the electrical downtilt module 506 or other device of the eNB 114 may determine an electrical downtilt angle for the antenna port determined based on the information received from the UE 116, e.g., the preferred antenna port, the PMI and/or others, in block 608. The electrical downtilt module 506 may determine the angle which may correspond to a cell edge UE geometry peak as illustrated in FIG. 3a or correspond to a combined antenna array gain nulling direction at 90 degree EoD as illustrated in FIG. 3b. Alternatively, the electrical downtilt module 506 may determine the angle which may correspond to a cell edge coupling loss peak as illustrated in FIG. 4.

By determining the electrical downtilt angle corresponding to the cell edge geometry peak, the combined antenna array gain nulling direction at 90 degree EoD, and/or the cell edge coupling loss, the interference to neighboring cells when the UE 116 reaches to the cell edge for the eNB 114 may be reduced.

In block 610, the codebook module 508 or other device of the eNB 114 may generate a codebook for the antenna elements of the antenna array 102, assuming that the antenna array 102 has the antenna elements 104 in the one or more antenna columns 106 in the vertical direction. The codebook may comprise a number of codewords, a codeword corresponding to one of the antenna ports (not show in FIG. 5). The codeword may comprise a number of vector elements, each vector element corresponding to one of the antenna elements 104. However, in other embodiments, the codebook may be pre-stored in a storage of the eNB 116 (not shown in FIG. 5) by a developer and therefore the codebook module 508 may not need to generate the codebook.

In block 612, the codebook module 508 or other device of the eNB 114 may select a codeword corresponding to the antenna port (e.g., the $i^{th}$ antenna port) that UE 116 selects and further calculate the antenna array weight $w_i$ by inputting the electrical downtilt angle determined in block 608 into the above-stated codeword.

In block 614, the antenna control module 510 or other device of the eNB 114 may control the antenna array 102 by mapping the antenna elements 104 of the antenna array 102 to the $i^{th}$ antenna port with the antenna array weight calculated by the codebook module 508. In this way, the antenna array 102 may receive or transmit data to or from the UE 116 at the $i^{th}$ antenna port, in block 616.

Figure 7:
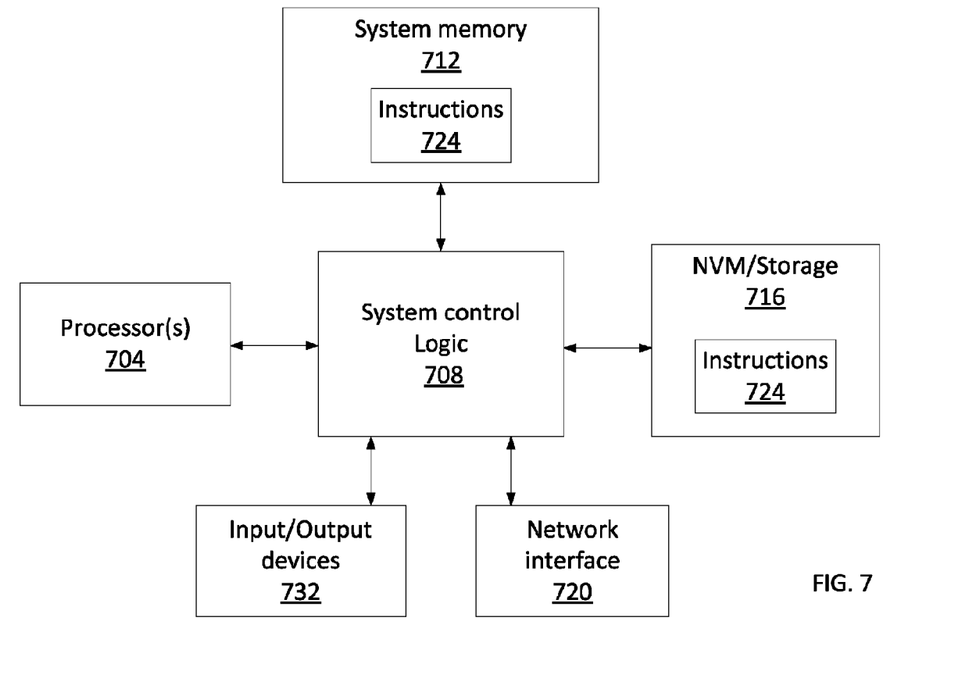
FIG. 7 schematically illustrates an example system in accordance with various embodiments.

FIG. 7 schematically illustrates an example system 700 in accordance with various embodiments. In an embodiment, the system 700 may comprise one or more processor(s) 704, system control logic 708 coupled with at least one of the processor(s) 704, system memory 712 coupled with system control logic 708, non-volatile memory (NVM)/storage 716 coupled with system control logic 708, and a network interface 720 coupled with system control logic 708.

Processor(s) 704 may include one or more single-core or multi-core processors. Processor(s) 704 may include any combination of general-purpose processors and dedicated processors (e.g., graphics processors, application processors, baseband processors, etc.). In an embodiment in which the system 700 implements the eNB 114, processors(s) 704 may be configured to execute one or more embodiment(s) as illustrated in FIGS. 5-6 in accordance with various embodiments.

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory (DRAM), for example.

NVM/storage 716 may include one or more tangible, non-transitory computer-readable media used to store data and/or instructions, for example. NVM/storage 716 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the network interface 720.

System memory 712 and NVM/storage 716 may respectively include, in particular, temporal and persistent copies of instructions 724. Instructions 724 may include instructions that when executed by at least one of the processor(s) 704 result in the system 700 implementing the method as described with reference to FIG. 6. In various embodiments, instructions 724, or hardware, firmware, and/or software components thereof, may additionally/alternatively be located in the system control logic 708, the network interface 720, and/or the processor(s) 704.

Network interface 720 may include the CSIRS configuration module 504, the electrical downtilt module 506, the codebook module 508, the antenna control module 510, and/or others as illustrated in FIG. 5, to provide a radio interface for system 700 to communicate over one or more network(s) and/or with any other suitable device. In various embodiments, the network interface 720 may be integrated with other components of system 700. For example, the network interface may include a processor of the processor(s) 704, memory of the system memory 712, NVM/Storage of NVM/Storage 716, and/or a firmware device (not being illustrated) having instructions that when executed by at least one of the processor(s) 704 result in the system 700 implementing the method as described with reference to FIG. 6.

Network interface 720 may further include any suitable hardware and/or firmware, such as a plurality of antennas (e.g., the antenna array 102) to provide a multiple input, multiple output radio interface. Network interface 720 for one embodiment may be, for example, a network adapter, a wireless network adapter, a telephone modem, and/or a wireless modem.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

The system 700 may further include input/output (I/O) devices 732. The I/O devices 732 may include user interfaces designed to enable user interaction with the system 700, peripheral component interfaces designed to enable peripheral component interaction with the system 700, and/or sensors designed to determine environmental conditions and/or location information related to the system 700.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 720 to communicate with components of a positioning network, e.g., a global positioning system (GPS) satellite.

In various embodiments, the system 700 may be an eNB, such as, the eNB 116. In various embodiments, system 700 may have more or less components, and/or different architectures.

The disclosure may include various example embodiments disclosed below.

In example embodiment 1, an apparatus may comprise an electrical downtilt module to determine an electrical downtilt angle for an antenna port selected from a number of antenna ports based on information from an user equipment (UE); and a codebook module to select a codeword corresponding to the antenna port from a codebook and calculate a weight of an antenna array of the eNB through inputting the electronic downtilt angle into the codeword, wherein the codebook has a first number of codewords, each of the codewords having a second number of elements to represent the weight of the antenna array, and wherein each of the codewords corresponds to each of the antenna ports and each of the elements corresponds to each antenna of the antenna array.

In example embodiment 2, the electrical downtilt angle according to the example embodiment 1 may be determined to reduce an antenna array gain for the antenna array at 90 degree elevation of departure (EoD).

In example embodiment 3, the electrical downtilt angle according to any of the example embodiments 1-2 may be determined to increase a cell edge coupling loss for the UE.

In example embodiment 4, the codeword according to any of the example embodiments 1-3 may be represented by a following equation:

$$w_i = \frac{1}{\sqrt{M}} \begin{bmatrix} 1 \\ e^{j(\alpha+\theta_i)} \\ e^{j2(\alpha+\theta_i)} \\ \vdots \\ e^{j(M-1)(\alpha+\theta_i)} \end{bmatrix}, 0 \leq i \leq N-1$$

wherein, M represents a number of the antennas, N represents the number of antenna ports, $w_i$ represents the weight of the antenna array at $i^{th}$ antenna port, and $\alpha+\theta_i$ represents the electronic downtilt angle.

In example embodiment 5, the information according to any of the example embodiments 1-4 may comprise the antenna port or a precoding matrix indicator (PMI) associated with the antenna port that the UE selects from the number of antenna ports based on channel state information reference signal (CSIRS) configuration information received from the eNB.

In example embodiment 6, the antenna control module according to any of the example embodiments 1-5 may control the antenna array based on the weight calculated by the codebook module.

In example embodiment 7, the apparatus according to any of the example embodiments 1-6 may further comprise a transceiver to transmit the CSIRS configuration information to the UE and to receive the information related to the antenna port from the UE.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus, comprising:
an electrical downtilt circuitry to determine an electrical downtilt angle for an antenna port selected from a number of antenna ports based on information from a user equipment (UE);
and a codebook circuitry to select a codeword corresponding to the antenna port from a codebook and calculate a weight of an antenna array of an eNodeB (eNB) through inputting the electrical downtilt angle into the codeword, wherein the codebook has a first number of codewords, each of the codewords having a second number of elements to represent the weight of the antenna array, and wherein each of the codewords corresponds to each of the antenna ports and each of the elements corresponds to each antenna of the antenna array.

2. The apparatus of claim 1, wherein the electrical downtilt angle is determined to reduce an antenna array gain for the antenna array at 90 degree elevation of departure (EoD).

3. The apparatus of claim 1, wherein the electrical downtilt angle is determined to increase a cell edge coupling loss for the UE.

4. The apparatus of claim 1, wherein the codeword is represented by a following equation:

$$w_i = \frac{1}{\sqrt{M}} \begin{bmatrix} 1 \\ e^{j(\alpha+\theta_i)} \\ e^{j2(\alpha+\theta_i)} \\ \vdots \\ e^{j(M-1)(\alpha+\theta_i)} \end{bmatrix}, 0 \leq i \leq N-1$$

wherein, M represents a number of the antennas, N represents the number of antenna ports, $w_i$ represents the weight of the antenna array at $i^{th}$ antenna port, and $\alpha+\theta_i$ represents the electronic downtilt angle.

5. The apparatus of claim 1, wherein the information received from the UE comprises the antenna port or a precoding matrix indicator (PMI) associated with the antenna port that the UE selects from the number of antenna ports based on channel state information reference signal (CSIRS) configuration information received from the eNB.

6. The apparatus of claim 5, further comprising:
a transceiver to transmit the CSIRS configuration information to the UE and to receive the information related to the antenna port from the UE.

7. The apparatus of claim 1, further comprising:
an antenna control circuitry to control the antenna array based on the weight calculated by the codebook circuitry.

8. A method, comprising:
determining an electrical downtilt angle for an antenna port selected from a number of antenna ports based on information from a user equipment (UE);
and selecting a codeword corresponding to the antenna port from a codebook and calculating a weight of an antenna array of an eNodeB (eNB) through inputting the electronic downtilt angle into the codeword, wherein the codebook has a first number of codewords, each of the codewords having a second number of elements to represent the weight of the antenna array, and wherein each of the codewords corresponds to each of the antenna ports and each of the elements corresponds to each antenna of the antenna array.

9. The method of claim 8, wherein the electrical downtilt angle is determined to reduce an antenna array gain for the antenna array at 90 degree elevation of departure (EoD).

10. The method of claim 8, wherein the electrical downtilt angle is determined to increase a cell edge coupling loss for the UE.

11. The method of claim 8, wherein the codeword is represented by a following equation:

$$w_i = \frac{1}{\sqrt{M}} \begin{bmatrix} 1 \\ e^{j(\alpha+\theta_i)} \\ e^{j2(\alpha+\theta_i)} \\ \vdots \\ e^{j(M-1)(\alpha+\theta_i)} \end{bmatrix}, 0 \leq i \leq N-1$$

wherein, M represents a number of the antennas, N represents the number of antenna ports, $w_i$ represents the weight of the antenna array at $i^{th}$ antenna port, and $\alpha+\theta_i$ represents the electronic downtilt angle.

12. The method of claim 8, wherein the information received from the UE comprises the antenna port or a precoding matrix indicator (PMI) associated with the antenna port that the UE selects from the number of antenna ports based on channel state information reference signal (CSIRS) configuration information received from the eNB.

13. The method of claim 12, further comprising:
   transmitting the CSIRS configuration information to the UE and to receive the information related to the antenna port from the UE.

14. The method of claim 8, further comprising:
   controlling the antenna array based on the weight calculated by a codebook circuitry.

15. A non-transitory computer readable medium encoded with computer executable instructions, which when accessed, causes a mobile station to perform operations comprising:
   determining an electrical downtilt angle for an antenna port selected from a number of antenna ports based on information from a user equipment (UE);
   and selecting a codeword corresponding to the antenna port from a codebook and calculating a weight of an antenna array of an eNodeB (eNB) through inputting the electrical downtilt angle into the codeword, wherein the codebook has a first number of codewords, each of the codewords having a second number of elements to represent the weight of the antenna array, and wherein each of the codewords corresponds to each of the antenna ports and each of the elements corresponds to each antenna of the antenna array.

16. The non-transitory computer readable medium of claim 15, wherein the electrical downtilt angle is determined to reduce an antenna array gain for the antenna array at a 90 degree elevation of departure (EoD).

17. The non-transitory computer readable medium of claim 15, wherein the electrical downtilt angle is determined to increase a cell edge coupling loss for the UE.

18. The non-transitory computer readable medium of claim 15, wherein the codeword is represented by a following equation:

$$w_i = \frac{1}{\sqrt{M}} \begin{bmatrix} 1 \\ e^{j(\alpha+\theta_i)} \\ e^{j2(\alpha+\theta_i)} \\ \vdots \\ e^{j(M-1)(\alpha+\theta_i)} \end{bmatrix}, 0 \leq i \leq N-1$$

wherein, M represents a number of the antennas, N represents the number of antenna ports, $w_i$ represents the weight of the antenna array at $i^{th}$ antenna port, and $\alpha+\theta_i$ represents the electronic downtilt angle.

19. The non-transitory computer readable medium of claim 15, wherein the information received from the UE comprises the antenna port or a precoding matrix indicator (PMI) associated with the antenna port that the UE selects from the number of antenna ports based on channel state information reference signal (CSIRS) configuration information received from the eNB.

20. The non-transitory computer readable medium of claim 19, further comprising:
   transmitting the CSIRS configuration information to the UE and to receive the 15 information related to the antenna port from the UE.

21. The non-transitory computer readable medium of claim 15, further comprising:
   controlling the antenna array based on the weight calculated by a codebook circuitry.

* * * * *

UNITED STATES PATENT AND TRADEMARK OFFICE
CERTIFICATE OF CORRECTION

PATENT NO. : 9,762,306 B2  
APPLICATION NO. : 14/911262  
DATED : September 12, 2017  
INVENTOR(S) : Chen et al.

Page 1 of 1

It is certified that error appears in the above-identified patent and that said Letters Patent is hereby corrected as shown below:

Column 12  
Line 27, delete "15" between --the-- and --information--

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*